United States Patent
Suzuki

(10) Patent No.: US 7,996,870 B2
(45) Date of Patent: Aug. 9, 2011

(54) INFORMATION PROCESS DEVICE, MUTUALLY CONNECTED THROUGH A NETWORK AND RECEIVING DELIVERY INFORMATION SUCH AS MOVIES OR MUSIC THROUGH A NETWORK, AND A METHOD AND PROGRAM FOR THE SAME

(75) Inventor: Tomohiro Suzuki, Nagoya (JP)

(73) Assignee: Brother Kogyo Kabushiki Kaisha, Nagoyo (JP)

( * ) Notice: Subject to any disclaimer, the term of this patent is extended or adjusted under 35 U.S.C. 154(b) by 156 days.

(21) Appl. No.: 12/320,271

(22) Filed: Jan. 22, 2009

(65) Prior Publication Data
US 2009/0210914 A1    Aug. 20, 2009

(30) Foreign Application Priority Data
Feb. 15, 2008   (JP) ................................. 2008-035103

(51) Int. Cl.
G06F 12/14 (2006.01)
H04N 7/16 (2006.01)

(52) U.S. Cl. ............. 725/87; 709/231; 386/260; 726/26

(58) Field of Classification Search .................... 725/87; 709/231; 386/260; 726/26
See application file for complete search history.

(56) References Cited

U.S. PATENT DOCUMENTS

| | | | | |
|---|---|---|---|---|
| 7,161,957 B2 * | 1/2007 | Wang et al. | .................... | 370/468 |
| 7,650,646 B2 * | 1/2010 | Asano et al. | .................... | 726/32 |
| 7,653,603 B1 * | 1/2010 | Holtkamp et al. | ............... | 705/72 |
| 2004/0111613 A1 * | 6/2004 | Shen-Orr et al. | ............. | 713/165 |
| 2005/0238325 A1 * | 10/2005 | Tanabe et al. | .................... | 386/95 |
| 2005/0262321 A1 * | 11/2005 | Iino | ................................ | 711/164 |
| 2005/0273399 A1 * | 12/2005 | Soma et al. | ..................... | 705/26 |
| 2006/0031558 A1 * | 2/2006 | Ortega et al. | .................. | 709/232 |
| 2007/0047845 A1 * | 3/2007 | Aoki et al. | ..................... | 382/305 |
| 2007/0283043 A1 | 12/2007 | Kiyohara et al. | | |
| 2008/0010373 A1 * | 1/2008 | Tojo | .............................. | 709/225 |
| 2008/0091954 A1 * | 4/2008 | Morris et al. | .................. | 713/187 |
| 2008/0301750 A1 * | 12/2008 | Silfvast et al. | ................ | 725/131 |
| 2009/0013027 A1 * | 1/2009 | Tanaka | .......................... | 709/203 |
| 2009/0070587 A1 * | 3/2009 | Srinivasan et al. | ............ | 713/176 |
| 2009/0074185 A1 * | 3/2009 | Srinivasan et al. | ............ | 380/255 |
| 2010/0146569 A1 * | 6/2010 | Janardhan et al. | .............. | 725/98 |

FOREIGN PATENT DOCUMENTS

| | | |
|---|---|---|
| JP | A-10-336625 | 12/1998 |
| JP | A-2004-350043 | 12/2004 |
| JP | A-2005-26921 | 1/2005 |
| JP | A-2006-197400 | 7/2006 |

* cited by examiner

Primary Examiner — Alina N. Boutah
(74) Attorney, Agent, or Firm — Oliff & Berridge

(57) ABSTRACT

An information processing apparatus carries out a process using delivery information delivered through a network. Only divisional delivery information used in the process of an n-time speed and acquired through a network by dividing the delivery information when the process is carried out at the n-time speed (where n>1) is acquired. Confirmation information used in confirming whether or not the divisional delivery information thus acquired is normally acquired through the network then is acquired, and the confirmation process of whether or not the divisional delivery information is normally acquired is carried out using the confirmation information. A processor carries out the process of the n-time speed using the divisional delivery information when the divisional delivery information is determined to have been normally acquired.

17 Claims, 9 Drawing Sheets

INFORMATION PROCESS DEVICE, MUTUALLY CONNECTED THROUGH A NETWORK AND RECEIVING DELIVERY INFORMATION SUCH AS MOVIES OR MUSIC THROUGH A NETWORK, AND A METHOD AND PROGRAM FOR THE SAME

The entire disclosures of Japanese Patent Application No. 2008-35103 filed on Feb. 15, 2008 including the specification, claims, drawings and summary are incorporated herein by reference in its entirety.

BACKGROUND OF THE INVENTION

1. Field of the Invention

The present invention relates to the field of an information process device, a delivery information input device, an information process method, and an information processing program. Specifically, it belongs to a technical field of an information process device that is mutually connected through a network such as internet and receives delivery information such as movie and music through the network, and a delivery information input device that inputs the delivery information to the network, an information process method for the information process device and the delivery information input device respectively, and an information processing program used in the information process device or the delivery information input device. The above-mentioned delivery information is simply referred to as "content" hereinafter.

2. Discussion of Related Art

Recently, a content delivery service such as VOD (video on demand) and internet television has been prevailed due to prevalence of a so-called broadband line.

What noticed is networks of a tree type and a grid type using a so-called P2P (Peer-to-Peer) network as a new mode alternative to a server client method that is a mainstream of delivery mode in a current content delivery service. In the P2P network, all terminal devices that participating in the network and receiving data delivery are connected through, for example, a network such as the internet. Here, concretely, these terminal devices are realized by a set top box, a personal computer, or the like that are connected to the above-mentioned network installed every home. In the P2P network, all or part of a processing unit and a memory unit installed in the respective terminal devices are provided to an entire network, and all the terminal devices share all loads that are generated by searching and sending and receiving content data subject to be delivered. Such the configuration enables the P2P network to solve disadvantages of the conventional server client method described above, that are concentration of access from respective terminal devices to a server as a delivery source and high administration cost of servers or the like. Here, as the conventional art related to a grid-type network using the P2P network, for example, Japanese Unexamined Patent Publication No. 2006-197400 described below is cited.

On the other hand, although having the above-mentioned characteristics, the P2P network has a disadvantage that the user of the other terminal device who is to be the other party to receive and send data through a network is not necessarily a reliable user of the terminal device in terms of information leak or the like. This disadvantage is caused by the fact that the terminal device configuring the network is the above-mentioned set top box, personal computer or the like. In the P2P network currently developed to solve this disadvantage, it is configured in such that so-called user authentication process is carried out when a new terminal device participates in the network itself, or an falsification check is carried out when content data are obtained through the network.

Here, the above-mentioned falsification check that is reviewed in the existing P2P network is briefly described.

Ordinarily, as a method of carrying out the falsification check process, there is a method using a so-called "hash value" that is corresponding to content data being a delivery subject. More particularly, in the existing P2P network, the above-mentioned hash value corresponding to a so-called metafile added to when respective contents are delivered is registered (described) in a catalog file used when contents communicable at that time are introduced to respective terminal devices. Further, the above-mentioned hash value corresponding to content data forming the content itself is registered (described) in the metafile. Upon completion of delivery of the content data to the terminal devices, comparison is made in the terminal device receiving the delivery between a hash value newly generated from the content data themselves thus delivered and the hash value previously described in the metafile. Based on this, in a case where thus compared both sides match or have a corresponding value, falsification is not made for the content data and it is verified that the delivery is normally completed. Here, a process of checking falsification of the above-mentioned catalog file itself is carried out by verifying a so-called digital sign included in respective catalog files, in terminal devices or the like.

Content delivery and a reproduction process in the terminal device under the condition that the falsification check process is carried out are briefly described.

First, a normal reproduction process for the content or a reproduction process at a normal reproduction speed is briefly described.

In a case where the delivered content is reproduced in the terminal device at a normal reproduction speed and an amount of content data corresponding to the content is large, a start of reproduction itself of the content may be greatly delayed when the above-mentioned falsification check is carried out after all the content data are prepared.

Then according to a conventional technique, all the content data corresponding to a single content are first divided into files having data amount previously set up and delivered. At respective timing where all the data of respective files thus divided are completely delivered, it is configured such that the above-mentioned falsification check process and subsequent reproduction process are carried out for data in the divided file, in the acquired terminal devices. Hereinafter, a single file thus divided is simply referred to as "slice file".

Next, a double speed reproduction process for the content or a reproduction process at a reproduction speed of n-times (n>1) is briefly described.

Generally, a moving picture image of the above-mentioned content is formed of a series of plural static images that are referred to as "frame". It often occurs that a one-second moving picture image is usually formed of 30 frames of static images. Reproduction of the moving picture image is realized by sequentially shifting displays of respective static images forming the moving picture image, at high speed. Hereinafter, a static image as a basis of the static image sequentially reproduced is referred to as "key frame". In a case where, for example, the moving picture image is encoded on a basis of MPEG (Moving Picture Expert Group) standard, this key frame corresponds to a frame referred to as so-called "I (Intra-coded) picture".

Further, in the above-mentioned double speed reproduction process, only key frame data corresponding to this key frame are used (in other words, reproduction of frames except for the key frame is skipped) and timing of sending this to a decoder of the terminal device is shifted to realize the double speed reproduction process. Here, the double speed reproduction process may be realized by sending singly key frame data to the decoder plural times, depending on a degree of double speed or the like.

Japanese Unexamined Patent Publication No. 2006-197400 (FIGS. 1 to 5 and so on)

SUMMARY OF THE INVENTION

However, according to the configuration of the above-mentioned conventional double speed reproduction process, the following problems occur, in a case where the above-mentioned double speed reproduction process is carried out while the above-mentioned falsification check process is being carried out.

In other words, first, although only small number of key frame data are included in a singly slice file, the falsification check can not be carried out unless entire data of the single slice file are acquired, in order to carry out the double speed reproduction process using this small number of key frame data. Therefore, there is a problem that a delivery speed of the entire slice file including the key frame data cannot keep up with a speed of the double speed reproduction process, and as a result, the double speed reproduction process may end up with temporary suspension.

Second, in view of the above first problem, in order not to suspend the double speed reproduction process, start of the double speed reproduction process is delayed until the delivery of the slice files enough for a delivery speed of the slice file is not caught up with a speed of the double speed reproduction process is completed. However in this case, there is a problem that the user trying to reproduce the content has to wait a start of the double speed reproduction process for a period of the delay.

Thus, the present invention is provided in consideration of the above problems. An example of the objects is to provide an information process device that is capable of efficiently carrying out a double speed reproduction process for a content while carrying out a normal falsification check, a content input device inputting the content into a P2P network, an information process method in the information process device and the content input device respectively, and an information processing program used in the information process device or the content input device.

In order to solve the above problem, according to a first aspect of the present invention there is provided an information processing apparatus that carries out a process using delivery information delivered through a network including:

a divisional delivery information acquisition means for acquiring only divisional delivery information used in the process of an n-time speed and acquired through a network by dividing the delivery information when the process is carried out at the n-time (n>1) speed;

a confirmation information acquiring means for acquiring confirmation information used in confirming whether or not the divisional delivery information thus acquired is normally acquired through the network;

a confirmation means for carrying out the confirmation process of whether or not the divisional delivery information is normally acquired using the confirmation information; and a processing means for carrying out the process of the n-time speed using the divisional delivery information when the divisional delivery information is normally acquired.

Accordingly, when a process using the delivery information is carried out at the n-time speed, not only the divisional delivery information used for processing at the n-time speed is only acquired but also the process is done at the n-time speed after confirming that the divisional delivery information is normally acquired in use of the confirmation information separately acquired. Therefore, it is possible to prevent an interruption of the process of the n-time speed in the middle that is caused by processing after acquiring a part of the delivery information which is not used in the process of the n-time speed.

Further, since the normal acquisition is confirmed with respect to only the divisional delivery information, it is possible to minimize a time necessary for the confirmation and reduce a time before the process of the n-time speed is started.

DESCRIPTION OF THE PREFERRED EMBODIMENTS

Figure 1A:
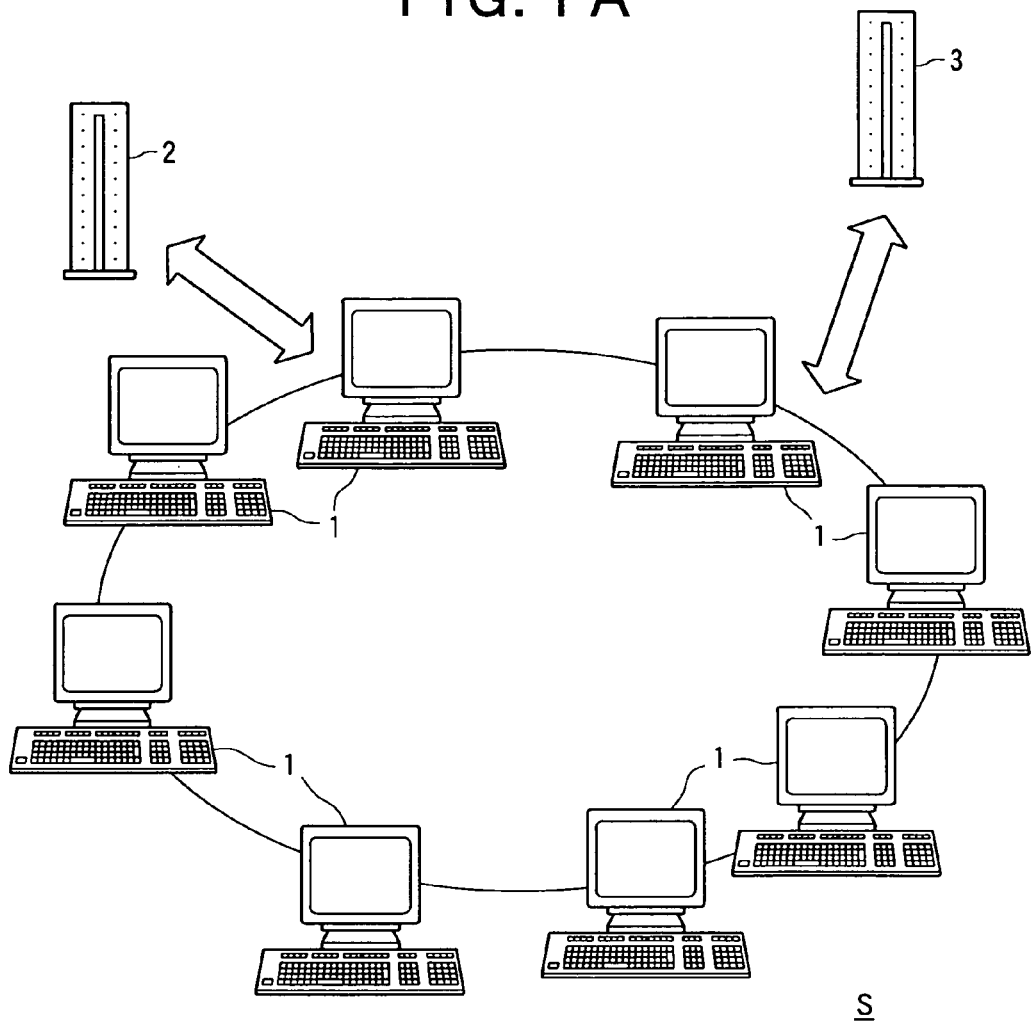
FIG. 1A is a view showing an entire structure of a delivery system according to an embodiment of the present invention.

Hereinafter, an embodiment of the present invention will be described based on figures. Each designation of numerical reference in the drawings is typically as follows:

1: Node;
2: Connection destination introduction server;
3: Content input server;
21: Control unit;
22: Memory unit;
23: Buffer memory;
24: Decoding accelerator;
25: Decode unit;
26: Image processing unit;
27: Display unit;
28: Sound processing unit;
29: Speaker;
29*a*: Communication unit;
29*b*: Input unit;
29*c*: IC slot card;
29*d*: Bus
29*e*: IC card
35: Control unit;

36: Memory unit;
37: Communication unit
38: Bus
SID1, SID2, SID3, SID4, SID5: Slice file ID data
MF: Meta file
KN: Key frame number data;
H1, H2: Hash value data;
CD: Content data;
GF: Catalogue file;
DF1, DF2, DF3, DF4, DF5: Slice file;
KF1, KF2, KF3, KF4, KF5, KF6, KF7, KF8, KF9, KF10: Key frame data;
F: Frame data.

Hereinafter, an embodiment of the present invention will be described in reference of figures.

Hereinafter, embodiments of the present invention will be described in reference of figures. Here, the embodiments described below are embodiments in a case where the present invention is applied to a content delivery system described in Japanese Unexamined Patent Publication No. 2006-197400.

(I) Configuration of Content Delivery System

First, with reference to FIG. 1A, overall configuration of a content delivery system (hereinafter the content delivery system is simply referred to as "delivery system") according to the embodiment is described. Here FIG. 1A is a view showing overall configuration of the delivery system according to the embodiment.

As shown in FIG. 1A, a delivery system S according to the embodiment is connected with plural node devices 1, for example, shown in the first figure, the second figure and paragraphs [0037] to [0053] of Japanese Unexamined Patent Publication No. 2006-197400. In addition to this, the delivery system includes a connection destination introduction server 2 and a content input server 3.

In this configuration, respective node devices (hereinafter simply referred to as "node") 1 are connected in a manner such that they can mutually give and receive data or the like through the physical network. It is similar to the content delivery system described in Japanese Unexamined Patent Publication No. 2006-197400 above.

On the contrary thereto, the connection destination introduction server 2 notifies the already-participating node 1 being a connection destination when the newly-participating node 1 newly participates in correspondence with, for example, a node introduction request message from node 1 (not shown) trying to newly participate in the delivery system S. Here as a way to select the already-participating node 1, for example, a method of searching a node 1 constantly connected to the delivery system S or the like may be used.

By this, the newly-participating node 1 sends the participation request message to the already-participating node 1 as described in the paragraph [0046] of Japanese Unexamined Patent Publication No. 2006-197400 and participates in the delivery system S.

On the other hand, the content input server 3 is a server managed by, for example, a manager of the delivery system S. The content input server 3 inputs the content data corresponding to the new content in the delivery system S in a manner such that the content data can be delivered to the node 1 participating in the delivery system S. More specifically, the content input server 3 has a content node being one of nodes 1 in the delivery system S memorize the above-mentioned content data. Accordingly, the content node publicizes the content corresponding to thus memorized content data to the other node 1 in the delivery system S.

More specifically, for example, paragraphs [0070] and [0071] of Japanese Unexamined Patent Publication No. 2006-197400 mentioned above can be referred to know this publication method. In this case, the content input server 3 carries out a content input process according to the embodiment described later as well as the conventional content input process described above.

Here, by methods respectively described later, it is possible that the node 1 according to the embodiment carries out a normal reproduction process of reproducing a desired content as the content at a normal (ordinary) reproduction speed and a double speed reproduction process of reproducing the content at an n-time (n>1) speed (e.g. a double speed, and a quad speed) higher than the above-mentioned normal reproduction speed.

(II) Embodiment of Configuration and Operation of Content Input Server

Next, a detail configuration and operation of the above-mentioned content input server will be described with reference to FIGS. 1B to 3.

Figure 1B:
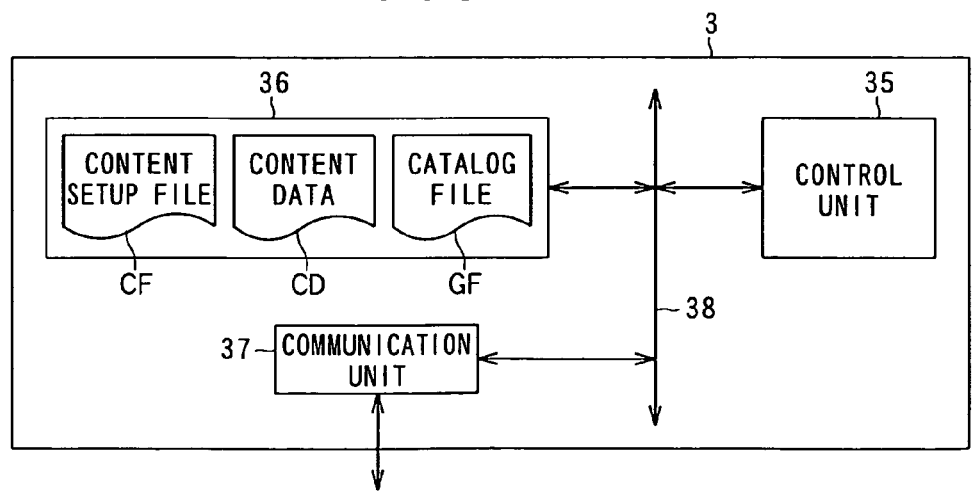
FIG. 1B is a block chart showing a detailed structure of content input server according to the embodiment.
Figure 2:
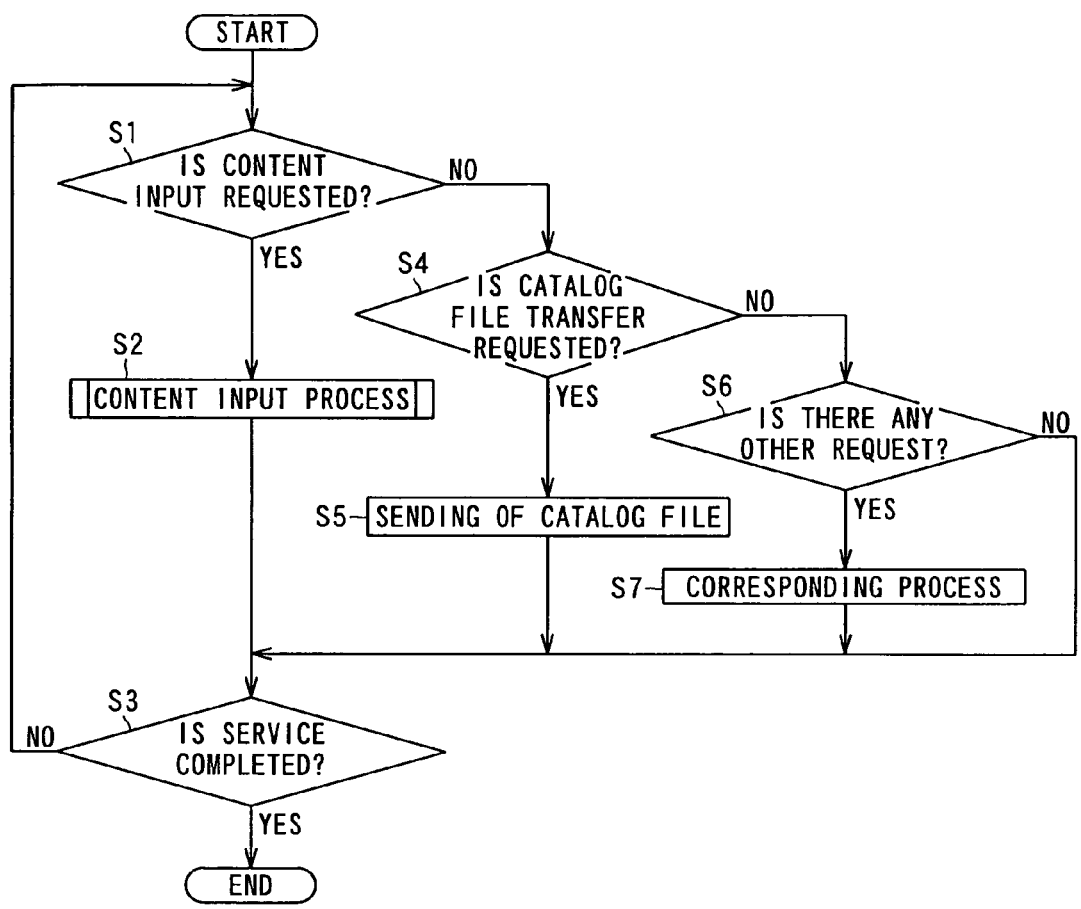
FIG. 2 is a flow chart showing an entire operation of the content input server according to the present embodiment.
Figure 3A:
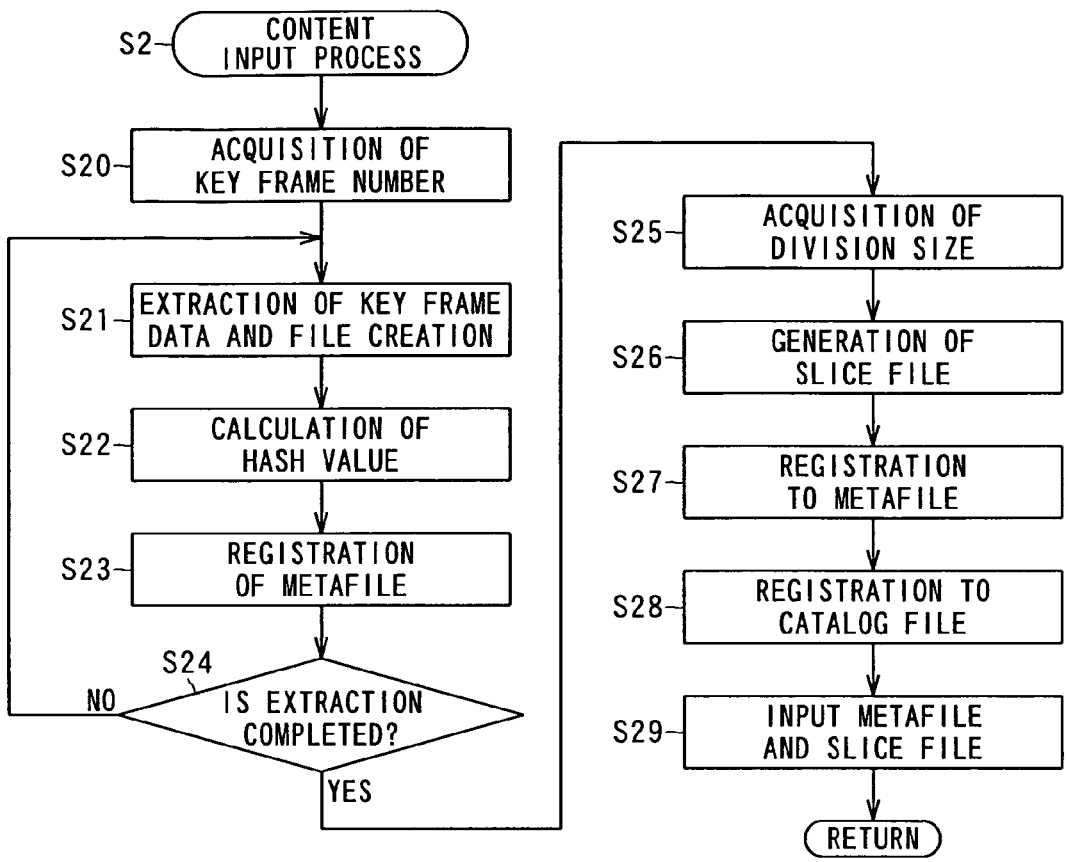
FIG. 3A is a flow chart showing a detailed operation of the content input server according to the embodiment.
Figure 3B:
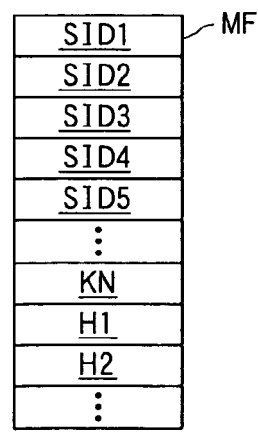
FIG. 3B shows an example of meta file according to the embodiment.

Here, FIG. 1B is a block diagram showing a detail configuration of a content input server 3 according to the embodiment. FIG. 2 is a flowchart showing an overall operation of the content input server 3. FIG. 3A is a flowchart showing a detail operation of the content input server 3 and FIG. 3B is a view showing a specific example of metafile according to the embodiment.

As shown in FIG. 1B, the content input server 3 according to the embodiment includes: a control unit 35 as a division delivery information generation means, a confirmation information generation means and a confirmation information process means; a memory unit 36; and a communication unit 37 as a delivery information input means. These elements are mutually connected through a bus 38.

Here, the control unit 35 is configured by a CPU having computing function, a RAM for work, a ROM (Read Only Memory) for memorizing various data and programs (including OS (Operating System) and various application) or the like. The memory unit 36 is configured by an HDD (Hard Disc Drive) or the like for memorizing and storing various data or the like. The communication unit 37 carries out a communication control with other node 1 or the like through a network configuring the delivery system S.

In this configuration, content data CD corresponding to a single content, a content setup file CF corresponding to the content, and the catalog file GF are memorized so as to be non-volatile.

In this case, in the catalog file GF, the catalog data about the content to be input from the content input server 3 are respectively included in every content.

On the other hand, in the content setup file CF, data indicative of an information amount by every slice file that is acquired by dividing the content data CD corresponding to the content dealing with the content setup file CF are described. The information amount by every slice file is preset by the manager or the like of the content input server 3 based on an information amount of entire content data, a delivery speed in the network configuring the delivery system S, a buffer capacity in respective nodes 1 when reproduced, a normal reproduction speed in respective nodes 1 or the like.

In addition thereto, there is described, in the content setup file, CF key frame number data indicative of a number of the key frames included in a file for checking the key frame according to the embodiment only, which key frame is configured by the key frame included in the respective slice files. This key frame number is also preset by the above-mentioned manager or the like in a manner similar to the case of information amount by every slice file.

Here, the above-mentioned content setup file CF and the content data CD are paired, and the pair of the content setup file CF and content data CD are memorized with respect to a single content.

Further, a CPU included in the control unit 35 executes a program (not shown) memorized by the memory unit 36 or the like, and the control unit 35 integrally controls the content input server 3 in its entirety. Further, the control unit 35 executes each and every of processes according to the embodiment described later using the content setup file CF thus memorized or the like.

Next, an operation of the content input server 3 according to the embodiment will be described with reference to FIG. 2.

As shown in FIG. 2, the control unit 35 of the content input server 3 according to the embodiment constantly monitors whether or not a request that content is newly input in the delivery system S is made from an operation unit (not shown) or from an outside (Step S1). When the request is made (Step S1: YES), the control unit 35 carries out a content input process described later (Step S2).

Thereafter, the control unit 35 confirms whether or not an operation of ending of service as the content input server 3, for example, in the above-mentioned operation unit (not shown) or the like (Step S3). Accordingly, when the completion operation is carried out (Step S3: YES), the control unit 35 completes the operation as the content input server 3. On the other hand, when the completion operation is not carried out (Step S3: NO), the control unit 35 returns to Step S1 and continues the above-mentioned monitoring (Step S1).

On the other hand, when the content input request is not made (Step S1: NO) after monitoring by Step S1, the control unit 35 confirms whether or not a sending request message of requesting to send the above-mentioned catalog file GF being a list of the contents capable of being delivered at the time is sent from any one of nodes 1 participating in the delivery system S (Step S4). When the sending request message is sent (Step S4: YES), the control unit 35 reads out the catalog file GF thus requested from the memory unit 36 and sends it to the node 1 sending the sending request message (Step S5). Subsequently, the control unit 35 goes to the process in Step S3 and repeats the processes described above.

Next, in judgment of Step S4, when the above-mentioned sending request message is not sent (Step S4: NO), the control unit 35 confirms whether or not the other request is made from the operation unit or from outside (Step S6). Accordingly, when the other request is made (Step S6: YES), the control unit 35 carries out the process in response to the request (Step S7). Subsequently the control unit 35 goes to the process of Step S3 and repeats the processes described above. On the other hand, in the judgment of Step S6, when the other request is not made (Step S6: NO), the control unit 35 goes to the process of Step S3 and repeats the processes described above.

Next, a content input process of the above-mentioned Step S2 is described with reference to FIG. 3.

As shown in FIG. 3, in the content input process of Step S2, the control unit 35 first refers to the content setup file CF corresponding to the content subject to be inputted and acquires the above-mentioned key frame number data from the content setup file CF (Step S20).

Next, the control unit 35 creates the above-mentioned key frame checking file using key frame data of the acquired number and makes the memory unit 36 temporarily memorize (Step S21). The control unit 35 calculates a hash value for the key frame checking file thus created by using the preset hash function (Step S22). Subsequently, the control unit 35 describes (registers) the hash value thus calculated together with the above-mentioned key frame number data in the metafile corresponding to the content to be inputted (Step S23). Next the control unit 35 confirms whether or not all key frames to be used for creating the key frame checking file is completely extracted (Step S24).

Then, when there exists a key frame not yet extracted in the judgment of Step S24 (Step S24: NO), the control unit 35 returns to Step S21 and repeats the processes in Steps S21 to S24 with respect to the key frame not yet extracted.

On the other hand, in the judgment of Step S24, when all key frame data are extracted and creation of a key frame data checking file using this is completed (Step S24: YES), the control unit 35 acquires data indicative of information amount of respective slice files from the content setup file CF corresponding to the content to be inputted (Step S25).

Accordingly, the control unit 35 divides the original content data CD to generate the above-mentioned respective slice files so as to be an information amount thus acquired. The control unit 35 further generates slice file ID data for identifying the respective slice files thus generated and a hash value calculated using a hash function preset with respect to the respective slice files (Step S26). Subsequently, the control unit 35 describes the respective slice file ID data thus generated and the respective hash values in the above-mentioned metafile (Step S27).

Next, the control unit 35 describes (registers) the content ID data for identifying the original content as an aggregation of the respective slice files in the list of the above-mentioned catalog file GF including the contents in one of the lists (Step S28).

Finally, the control unit 35 inputs in the delivery system S the above-mentioned metafile corresponding to the content generated in the processes of Steps S20 to S27 and the above-mentioned slice file generated by the process of Step S26 (Step S29). Subsequently, the control unit 35 returns to the process of Step S3 shown in FIG. 2 and repeats a series of the processes onward.

Figure 4:
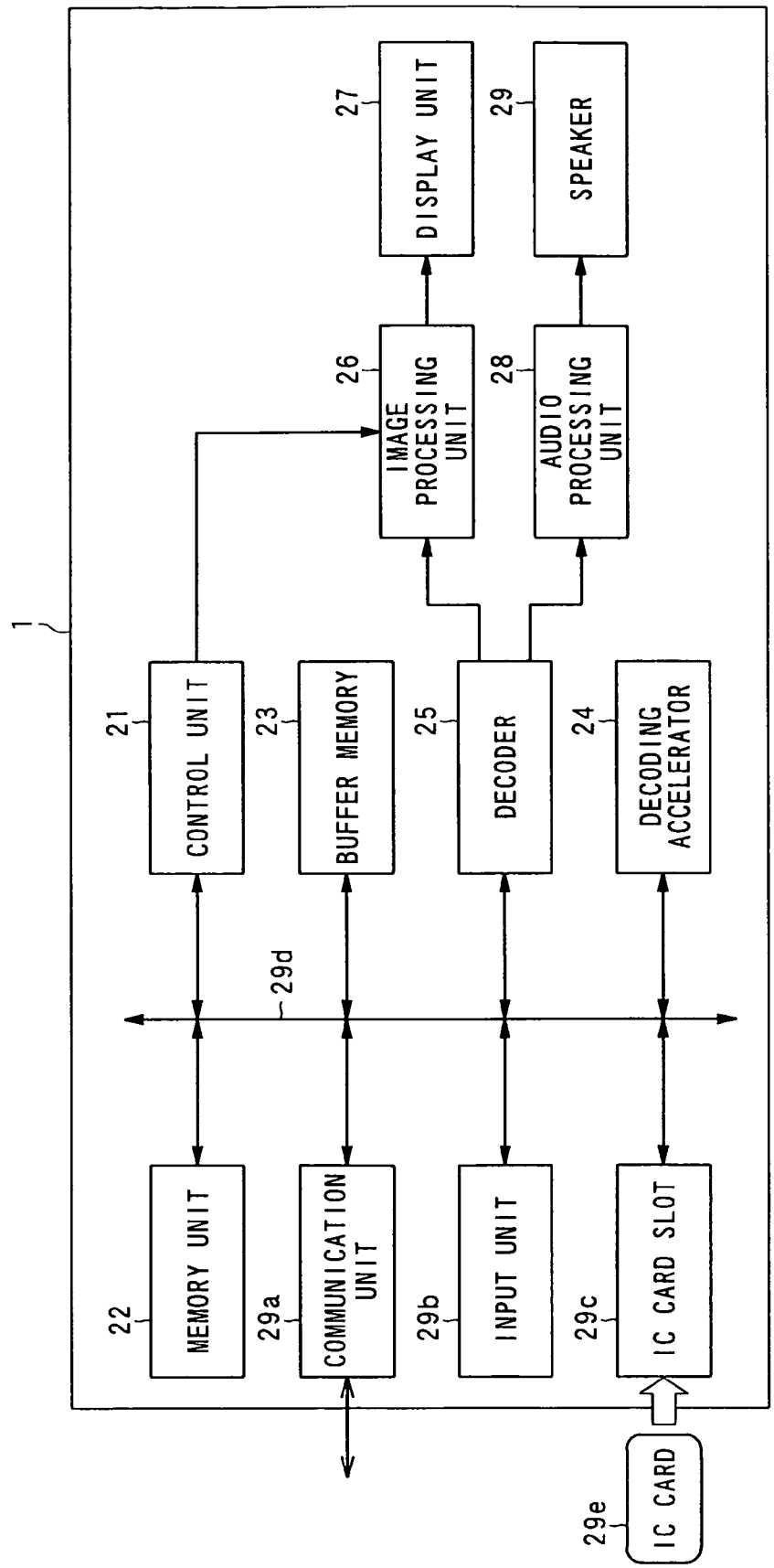
FIG. 4 is a block chart showing a detailed structure of a node according to the embodiment.
Figure 5:
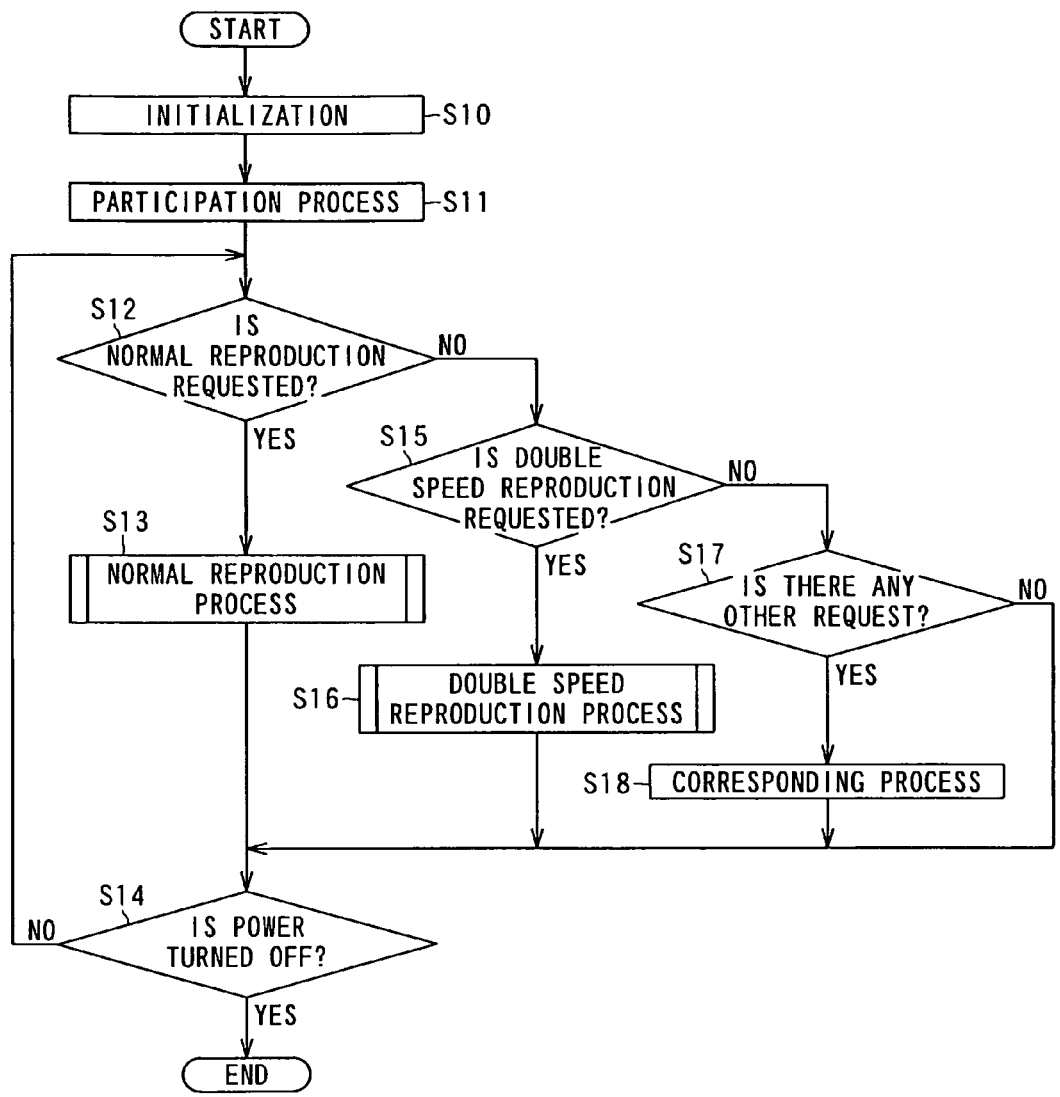
FIG. 5 is a flowchart showing an entire operation of in a node according to the embodiment of the present invention.

Finally, the nodes 1 respectively participating in the delivery system S search a desired content in the delivery system S by a method described in FIG. 5 and paragraphs [0062] to [0069] of Patent Document 1 by using a so-called distribution hash table described in FIGS. 2 to 4, and paragraphs [0037] to [0061] of the above Japanese Unexamined Patent Publication No. 2006-197400. The content data corresponding to the content discovered as a result of the search are acquired (downloaded) from the content node accumulating the content data by using a method according to the embodiment described later and then reproduced.

Here, in the input process of Step S29, the metafile (usually one per a single content) and the respective slice files are inputted to a node 1 that is mutually different from them in the delivery system S. Thus inputted slice file or the like is published in the delivery system S by the method described in, for example, paragraphs [0070] to [0072] of Japanese Unexamined Patent Publication No. 2006-197400.

Next, thus inputted metafile is specifically described and illustrated with FIG. 2B.

The metafile MF generated in the process of Steps S20 to S27 includes the above-mentioned slice file ID data SID1, SID2, SID3, SID4, SID5, . . . of the number of slice files, the above-mentioned key frame number data KN, the above-mentioned hash value data H1, H2 . . . corresponding to the above-mentioned respective key frame data checking files, as shown in, for example, FIG. 2B. In FIG. 2B, description of hash value data corresponding to the respective slice files themselves is omitted.

(III) Embodiment of Configuration and Operation of Node

Next, detailed configuration and operation of the above-mentioned respective nodes according to the embodiment are described with reference to FIGS. 4 to 9. Here, the respective nodes 1 according to the embodiment basically have the same detailed configuration and further independently carry out the same detailed operation respectively.

Figure 6:
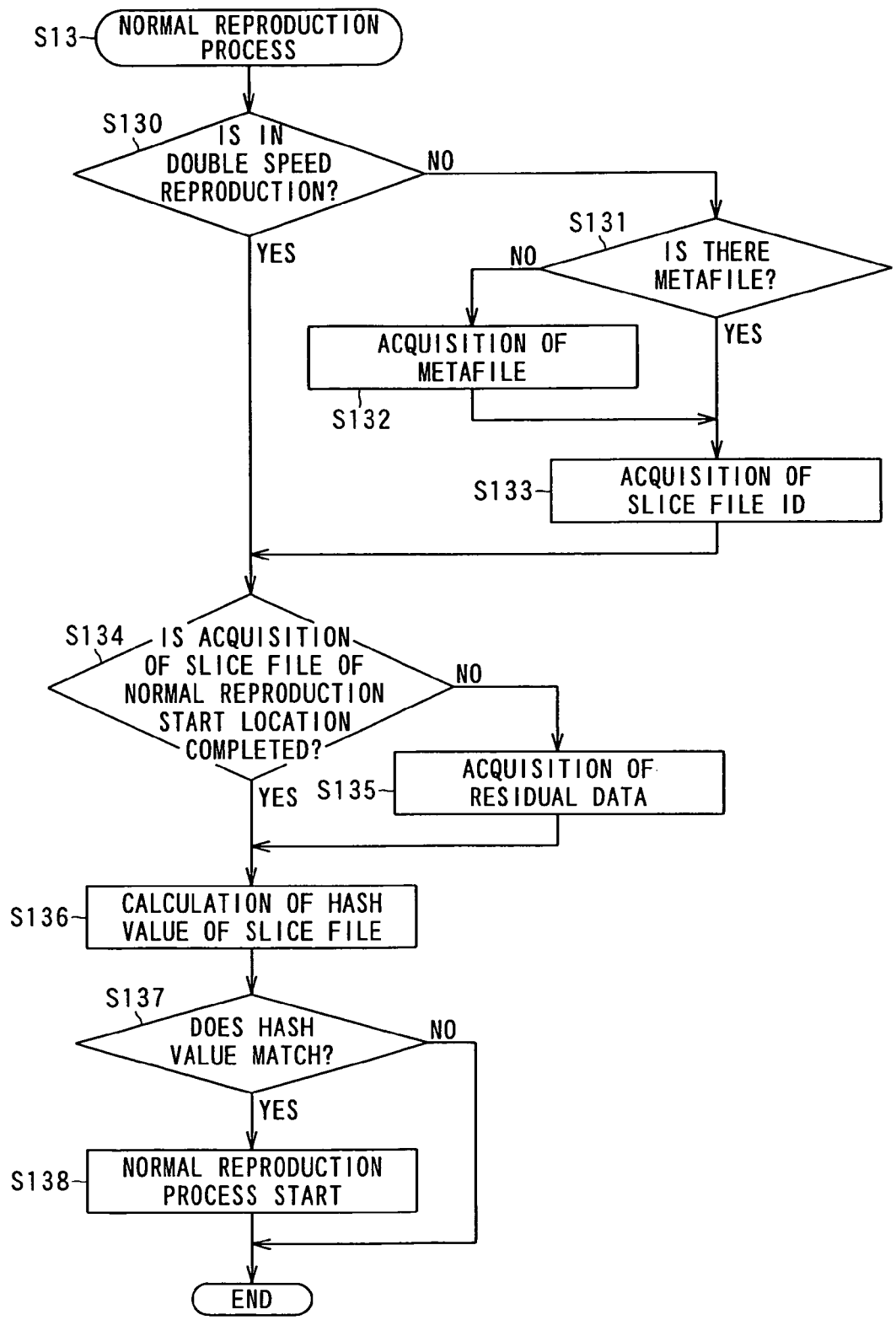
FIG. 6 is a flowchart showing an operation of a normal replay process in a node according to the embodiment of the present invention.
Figure 7:
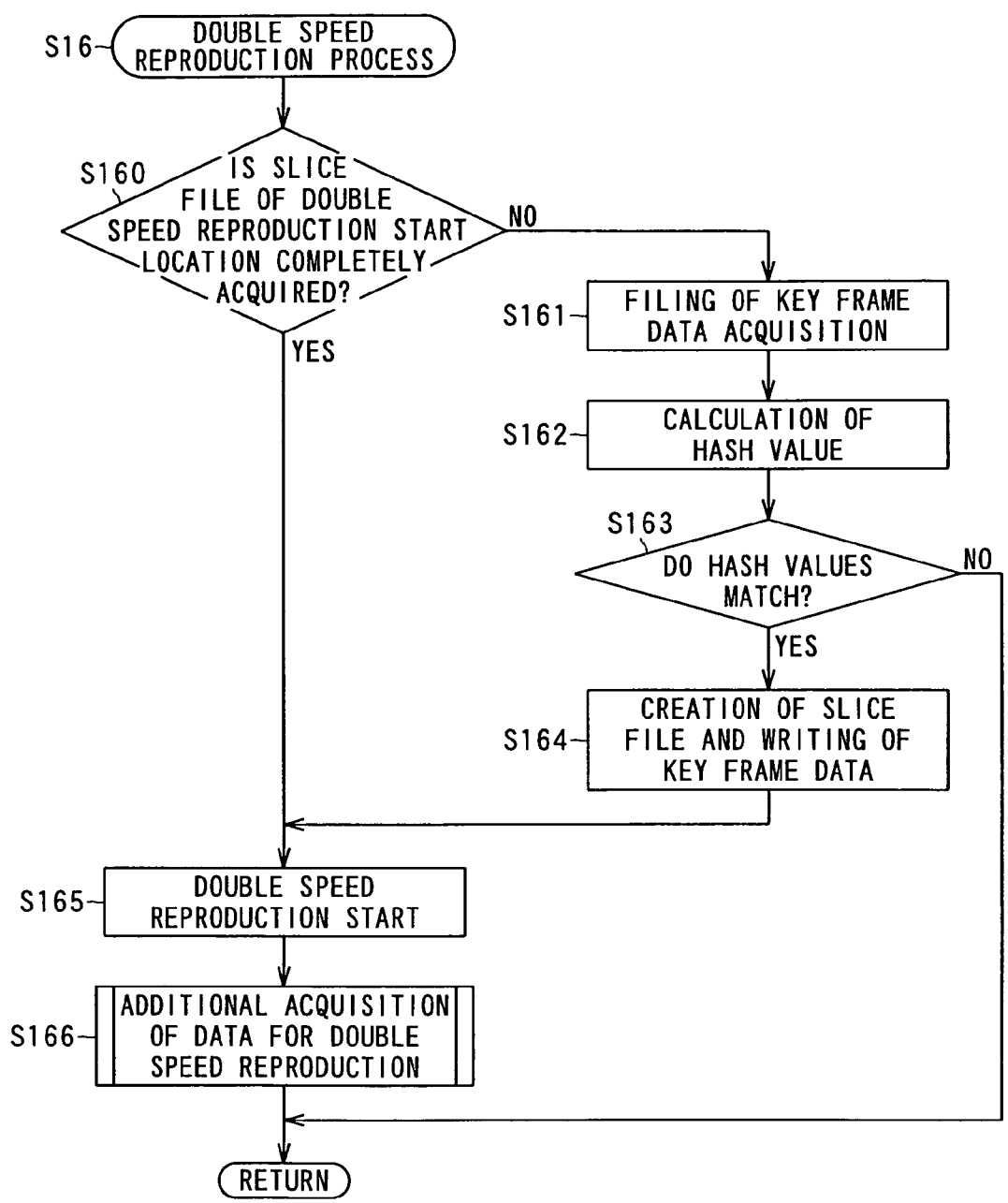
FIG. 7 is a flowchart showing an operation of a double speed replay process in a node according to the embodiment of the present invention.
Figure 8:
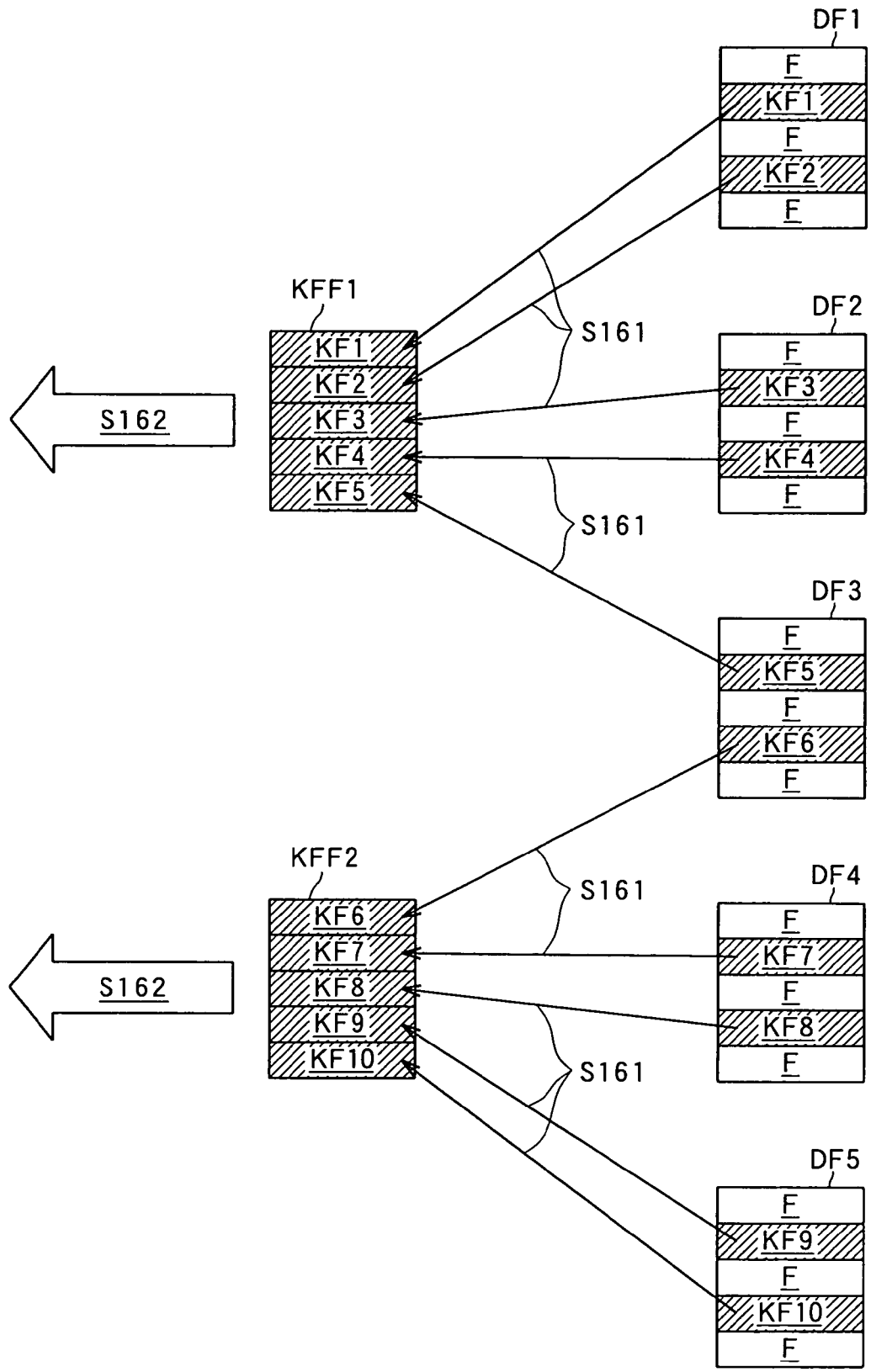
FIG. 8 illustrates production of a file for key frame check and a content of falsification check according to the embodiment of the present invention.
Figure 9:
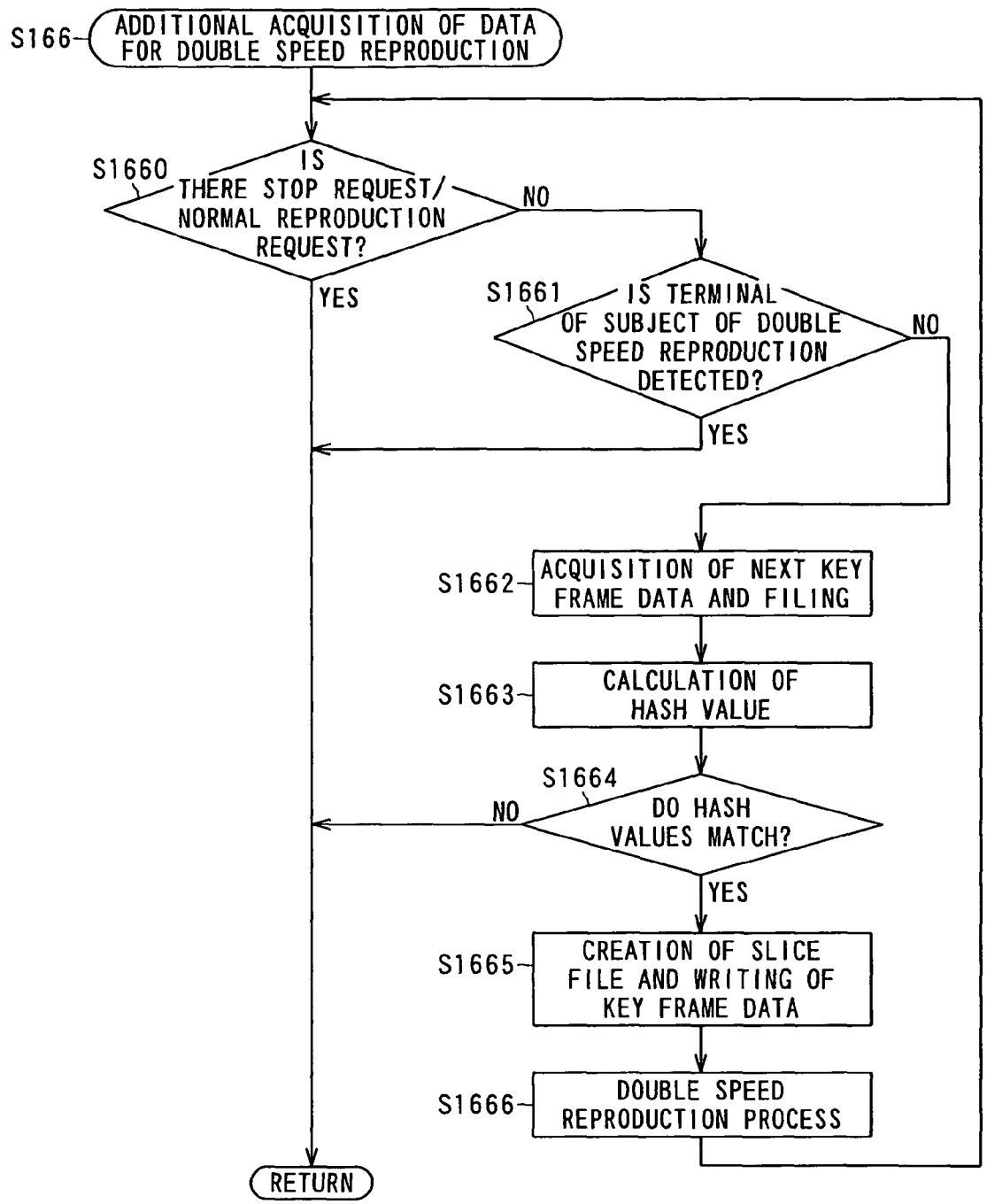
FIG. 9 is a flowchart showing an operation of acquisition process of the data for the double speed replay in a node according to the embodiment of the present invention.

Further, FIG. 4 is a block diagram showing the detailed configuration of the node 1. FIG. 5 is a flowchart showing an overall operation of the node 1. FIGS. 6, 7, and 9 are flowcharts showing the detailed operation of the node 1. In addition, FIG. 8 is a view showing a specific example of the detailed operation.

As shown in FIG. 4, the node 1 according to the embodiment is configured by including: a control unit 21 as a confirmation means and a process means; a memory unit 22; a buffer memory 23; a decoding accelerator 24; a decode unit 25; an image processing unit 26; a display unit 27; an audio processing unit 28; a speaker 29; a communication unit 29*a* as a divisional delivery information acquisition means, a confirmation information acquisition means, and a residual delivery information acquisition means; an input unit 29*b*; and an IC card slot 29*c*. These elements are mutually connected through a bus 29*d*.

At this time, the control unit 21 is configured by a CPU having computing function, a RAM for work, and a ROM or the like for memorizing various data and programs (including OS and various applications). The memory unit 22 is configured by an HDD or the like for memorizing various data, programs or the like. The buffer memory 23 temporarily accumulates (stores) the received content data.

Meanwhile, the decoding accelerator 24 decodes the content data CD thus accumulated in the buffer memory 23 using a decode key. The decode unit 25 decodes video data, audio data, and the like included in the decoded content data CD and reproduced (by data stretching or the like). Further, the image processing unit 26 carries out a predetermined image process on the reproduced video data or the like and outputs as an image signal.

On the other hand, the display unit 27 includes a CRT (Cathode Ray Tube), a liquid crystal display, and the like, and displays a corresponding image in response to the image signal outputted from the image processing unit 26. The audio processing unit 28 converts audio data thus reproduced in use of D/A (digital/analog) conversion into an analog audio signal, amplifies the signal thus converted by an amplifier, and outputs the same. Further, the speaker 29 outputs the audio signal outputted from the audio processing unit 28 as a sound wave.

Further, the communication unit 29*a* carries out communication control with other node 1 or the like through the communication line 9. The input unit 29*b* includes, for example, a mouse, a keyboard, an operation panel, and a remote controller, and outputs to the control unit 21 an instruction signal in response to various instructions from a user (viewer) The IC card slot 29*c* reads and writes information with respect to an IC card 29*e*.

Here, the IC card 29*e* is tamper resistant and is delivered from, for example, an operator of the delivery system S to a user of respective nodes 1. Here, the tamper resistant means that the IC card is provided with tampering measures so that secret data are protected against readout by an illegal means and are not easily analyzed. Such the IC card 29*e* is configured by having an IC card controller including CPU, a nonvolatile memory of tamper resistance, for example, EEPROM (Electrical Erasable and Programmable ROM), and the like. The nonvolatile memory memorizes a user ID, a decoding key for decoding encoded content data, a digital certificate, and the like. Here, the digital certificate is sent to a connection destination introduction server 2 when the node 1 participates in the delivery system S.

On the other hand, the buffer memory 23 is configured by, for example, a ring buffer memory of FIFO (First In First Out) format, and temporarily accumulates content data CD received through the communication unit 29*a* to a memory region indicated by a receiving pointer under the control of the control unit 21.

Here, the control unit 21 integrally controls the entire node 1 by causing CPU to read out a program memorized in the memory unit 22 or the like to thereby execute the program, and respectively carries out processes in accordance with to the embodiment described later. In addition thereto, the control unit 21 receives through the communication unit 29*a* various messages and plural packets that are sent from the other node 1 through the network configuring the delivery system S by the above-mentioned distribution hash table and writes them in the buffer memory 23, as a normal process. Further, the control unit 21 reads out the various messages and packets accumulated (packets received past in a given time) in the buffer memory 23 and further transfers them to the other node 1 through the communication unit 29*a* based on the distribution hash table. On the other hand, the buffer memory 23 reads out packets accumulated in the memory region of the buffer memory 23 that is indicated by a reproduction pointer, and outputs them to the decoding accelerator 24 and the decode unit 25 through the bus 29*d*.

Here, the above-mentioned program may be downloaded from, for example, a predetermined server on the network, or may be recorded in a recording medium such as CD-ROM (Compact disc-ROM) and read through a drive of the recording medium.

Next, an operation according to the embodiment in the node 1 is described in reference of FIGS. 5 to 9.

First, an overall operation of the node 1 is described using FIG. 5.

As shown in FIG. 5, in any one of the nodes 1 according to the embodiment, a main power is turned on in the node 1 by switching it on, and programs and various components that are memorized in the node 1 are first initialized by the control unit 21 of the node 1 (Step S10).

Then, upon completion of the initialization, in a case where the node 1 itself does not participate yet in the delivery system S, the control unit 21 carries out a participation process to the delivery system S using a method described in, for example, the paragraph [0046] of Japanese Unexamined Patent Publication No. 2006-197400 (Step S11).

Next, the control unit 21 confirms whether or not an operation of carrying out the normal reproduction process is carried out in the input unit 29*b* of the node 1 including the control unit 21 (Step S12). When confirming that the operation is carried out (Step S12: YES), the control unit 21 carries out a normal reproduction process described later (Step S13).

Subsequently, the control unit 21 monitors whether or not the power of the node 1 itself is turned off (Step S14). When it is not turned off (Step S14: NO), the control unit 21 returns to Step S12 and repeats the processes described above. When the power is turned off in the judgment of Step S14 (Step S14: YES), the control unit 21 remains to stop the function as the node 1.

On the other hand, when the operation of carrying out the normal reproduction process is carried out in the judgment of Step S12 (Step S12: NO), the control unit 21 confirms whether or not the operation of carrying out the double speed reproduction process is carried out (Step S15). When confirming that the operation is carried out (Step S15: YES), the control unit 21 carries out a double reproduction process described later (Step S16). Subsequently, the control unit 21 goes to Step S14 and repeats the processes described above.

Next, when the operation of carrying out the above double speed reproduction process is not carried out in the judgment of Step S15 (Step S15: NO), the control unit 21 confirms whether or not the other request is made in the input unit 29b or from the outside (Step S17). Accordingly, when the other request is made (Step S17: YES), the control unit 21 carries out a process in response to the request (Step S18). Subsequently, the control unit 21 goes to the process of Step S14 and repeats the processes described above. On the other hand, in the judgment of Step S17, when the other request is not made (Step S17: NO), the control unit 21 goes to the process of Step S14 and repeats the processes described above.

Next, a normal reproduction process according to Step S13 is described using FIG. 6 specifically.

As shown in FIG. 6, in the normal reproduction process according to the embodiment, the control unit 21 first confirms whether or not the content itself subject to the normal reproduction process is already subject to the double speed reproduction process (Step S16) in the node 1 (Step S130). When it is already subject to the double speed reproduction process (Step S130: YES), the control unit 21 goes to a process of Step S134 described later.

On the other hand, when the content is not subjected to the double speed reproduction process in the judgment of Step S130 (Step S130: NO), the control unit 21 confirms whether or not the metafile MF corresponding to the content subject to the normal speed reproduction process is already memorized in the node 1 (Step S131). When the metafile MF is not memorized (Step S131: NO), the control unit 21 acquires the metafile MF from the delivery system S (Step S132) and goes to a process of Step S133 described later. On the other hand, when the metafile MF is already memorized in the node 1 (Step S131: YES), the control unit 21 goes to a process of Step S133 described later. Here, specifically as the process of Step S132, the control unit 21 sends to the delivery system S a file request message of requesting the metafile MF by a conventional process similar to the process where a request message of requesting delivery of the content is sent. As the conventional process, the process described in, for example, FIG. 10 and paragraphs [0096] to [0100] of Japanese Unexamined Patent Publication No. 2006-197400.

When existence or acquisition of the necessary metafile MF is confirmed, next the control unit 21 acquires slice file ID data SID1, SID2, ... (Refer to FIG. 3B) from the metafile MF (Step S133).

Next, the control unit 21 confirms whether or not all of the slice files including a location of content data CD (i.e. timing on a reproduction time axis) that starts the normal reproduction process are already acquired based on thus acquired slice file ID data SID1 or the like (Step S134). When all the slice files are not acquired (Step S134: NO), the control unit 21 acquires data (not acquired data) left in the slice file by a process similar to the conventional process (Step S135) and goes to a process of Step S136.

On the other hand, when all of the slice files are already acquired in the judgment of Step S134 (Step S134: YES), next the control unit 21 calculates a hash value of thus acquired slice file using a preset hash function (Step S136). The control unit 21 compares the hash value thus calculated with a hash value with respect to the slice file (not shown) previously described in the metafile MF (Refer to Step S26 in FIG. 3A) and confirms the mutual identity (Step S137). When the identity is not confirmed in the process of Step S137 (Step S137: NO), the control unit 21 completes the normal reproduction process, goes to a process of Step S14, and repeats the processes described above. This is because there is a possibility that when the identity is not confirmed in the process of Step S137, the slice file subject to the normal reproduction process is altered at that time.

On the contrary thereto, when the identity is confirmed in the process of Step S137 (Step S137: YES), the control unit 21 suspends the active double speed reproduction process and starts the normal reproduction process continuing to use the slice file in that falsification is doubtless (Step S138). Then, the control unit 21 goes to the process of Step S14 and repeats the processes described above.

Next, the double speed reproduction process according to Step S16 is specifically described using FIGS. 7 to 9.

As shown in FIG. 7, in the double speed reproduction process according to the embodiment, the control unit 21 first confirms based on the acquired slice file ID data SID1 or the like (Refer to Step S133 in FIG. 6) that all the slice files including a location (timing on the above-mentioned reproduction time axis) of the content data CD starting the double speed reproduction process are already acquired in the node 1 (Step S160). When all of the slice files are acquired (Step S160: YES), the control unit 21 next starts the double speed reproduction process using key frame data in the slice file (Step S165). Subsequently, the control unit 21 carries out an additional acquisition process of the double speed reproducing data that is described later (Step S166). Then the control unit 21 goes to the process of Step S14, and then repeats the processes described above.

On the other hand, when all of the slice files are not acquired in the judgment of Step S160 (Step S160: NO), the control unit 21 next acquires key frame data of the number of the above-mentioned key frames described in the metafile MF thus acquired already (Refer to Step S132 in FIG. 6) from the delivery system S.

Next, the control unit 21 creates another key frame checking file using the key frame data thus acquired and makes the memory unit 22 temporally memorize it (Step S161).

Then the control unit 21 calculates a hash value of the key frame thus created for checking data using a preset hash function (Step S162). Subsequently, the control unit 21 compares the hash value thus calculated with the hash value H1, H2, ... (Refer to FIG. 3B) with respect to key frame checking file previously described in the metafile MF (Refer to Step S22 in FIG. 3A) and confirms a mutual identity (Step S163). When the identity is not confirmed in this process of Step S163 (Step S163: NO), the control unit 21 completes the double speed reproduction process, goes to the process of Step S14, and then repeats the processes described above. This is because there is a possibility that when the identity is not confirmed in the process of Step S163, the key frame data subject to the double speed reproduction process is altered at that time.

On the contrary, when the identity is confirmed in the process of Step S163 (Step S163: YES), the control unit 21 writes the key frame data where falsification is doubtless in an appropriate location of the region while securing a region for writing a slice file (not shown) in the memory unit 22 (Step S164). Subsequently, the control unit 21 goes to Step S165 and carries out a double speed reproduction process using thus written key frame data.

Here, processes of Step S161 and S162 are more specifically described using FIG. 8. In the example described hereinafter, the number of the key frame data configuring the key frame checking file is "5".

In Step S161, the control unit 21 respectively acquires key frame data KF1, KF2, KF3, KF4, KF5, KF6, KF7, KF8, KF9, KF10, . . . except for the frame data F that are not used in the double speed reproduction process from the respective slice files DF1, DF2, DF3, DF4, DF5, . . . that are distributed and memorized in the other node 1 of the delivery system S. Then the control unit 21 creates a single key frame checking file KFF1 using the first five key frame data KF1 to KF5 among thus acquired key frame data (Step S161). Similarly, the control unit 21 creates another one key frame checking file KFF2 following the key frame checking files of from KFF1 to KFF5, using key frame data KF6 to KF10, being another five key frame data following the above-mentioned key frame data KF1 to KF5, out of the key frame data thus acquired (Step S161).

Then a comparison process of a hash value related to the process of Step S162 is separately carried out to the key frame checking file KFF1 and the key frame checking file KFF2 respectively created.

Next, an additional acquisition process of the double speed reproduction data according to Step S166 is specifically described using FIG. 9.

As shown in FIG. 9, in the process of additional acquisition process, the control unit 21 confirms whether or not any one of operations of suspending the double speed reproduction process or staring the normal reproduction process is carried out in an input unit 29b of the node 1 (Step S1660). When any one of the operations is carried out (Step S1660: YES), the control unit 21 goes to the process of Step S14 and repeats the processes described above.

On the other hand, when neither the double speed reproduction process suspension operation nor the normal reproduction process start operation are carried out in the judgment of Step S1660 (Step S1660: NO), the control unit 21 next confirms whether or not the double speed reproduction process completes by the end of the content subject to the double speed reproduction process (Step S1661). When the double speed reproduction process is thoroughly completed up to the end (Step S1661:YES), the control unit 21 goes to the process of Step S14 and then repeats the processes described above.

On the other hand, when the double speed reproduction process is not completed by the end of the content subjected to the double speed reproduction process in the judgment of Step S1661 (Step S1661: NO), the control unit 21 acquires key frame data following the key frame data thus reproduced at the double speed from the delivery system S as many as a number of key frame data described in the metafile MF already acquired (Refer to Step S132 in FIG. 6). Next, the control unit 21 newly creates the above-mentioned key frame checking file using the key frame data thus acquired and causes the memory unit 22 to temporarily memorize the file (Step S1662).

Then the control unit 21 calculates a hash value of the key frame checking data thus created using the preset hash function (Step S1663). Subsequently, the control unit 21 compares the hash value thus calculated with the hash values H1, H2, . . . (Refer to FIG. 3B) with respect to the key frame checking file previously described in the metafile MF (Refer to Step S22 in FIG. 3A), and confirms mutual identity (Step S1664). When the control unit 21 cannot confirm the identity in this process of Step S1664 (Step S1664: NO), the control unit 21 goes to the process of Step S14 and then repeats the processes described above. This is because when the identity is not confirmed in the process of Step S1664, there is a possibility that key frame data subject to the double speed reproduction process is altered.

On the contrary thereto, when confirming the identity in this process of Step S1664 (Step S1664: YES), the control unit 21 writes the key frame data where falsification is doubtless in the appropriate location of a region while securing a slice file writing region in the memory unit 22 (Step S1665). Subsequently, the control unit 21 carries out the double speed reproduction process using thus written key frame data (Step S1666), returns to Step S1660, and repeats the processes described above.

Here, with respect to the process of Steps S1662 and S1663, the extraction of key frame data KF described using FIG. 8, the creation of the key frame checking file KFF, and the hash value calculation process are carried out sequentially. Accordingly, the double speed reproduction process using only key frame data KF continues without interruption, together with the processes described using FIGS. 7 and 8.

As described above, according to the operation of the node 1 participating in the delivery system S concerning the embodiment, when the reproduction process is carried out in the node 1 at n-time speed using a content, the control unit 21 only acquires key frame data KF used for the n-time speed reproduction process and carries out the reproduction process at an n-time speed after confirming that the key frame data KF are normally acquired using the hash value data H separately acquired. Therefore, it is possible to prevent a suspension of an n-time speed reproduction process in the middle, the suspension caused by execution of a reproduction process after acquiring the content portion (frame data F) that is not used in the n-time speed reproduction process, while securely checking confirmation of normality in acquiring the key frame data KF.

Further, it is possible to shorten a time required for confirmation until the n-time speed reproduction process starts, because it is confirmed whether or not acquisition is normally done only with respect to the key frame data KF.

Further, it is possible to confirm normality of acquisition while the number of hash value data H is restricted, because the confirmation process is carried out as a unit of key frame checking file KFF composed of plurality of key frame data KF.

Furthermore, the control unit 21 acquires a key frame data KF configuring a next key frame checking file KFF2 during n-time speed reproduction process is done using a single key frame checking file KFF1. Because the confirmation process for thus acquired key frame checking file KFF2 is carried out after the acquisition, it is possible to continue the confirmation process and the n-time speed reproduction process without interruption.

Further, when one-time speed reproduction process is carried out using an entire content, a residual content (frame data F) other than the key frame data KF is acquired. Further, because the one-time speed reproduction process starts after the confirmation process is done, it is possible to carry out the normal one-time speed reproduction process is carried out using the entire content together with the n-time speed reproduction process.

Further in the content input server 3, the key frame data KF and the hash value data H are respectively generated and acquired respectively by the nodes 1. Therefore, by an operation of the nodes 1 according to the embodiment using these data, it is possible to prevent the n-time speed reproduction process from being suspended in the middle because the reproduction process is carried out after acquiring the content portion (key frame data F) that is not used in the n-time speed reproduction process while securely confirming normality in acquiring the key frame data KF.

Further, because the content input server 3 produces hash value data H provided to confirm a file KFF for checking a key frame that is formed by collecting a plurality of key frame data previously set up it is possible to restrict expansion of a number of hash value data H.

Here, programs corresponding to flowcharts shown in FIGS. 2 and 3A are recorded in an information recording medium such as a flexible disc or a hard disc, or acquired through internet or the like and recorded. When these are read out and executed by a general-purpose computer, the computer may be utilized as a control unit 35 inside the content input server 3 according to the embodiment.

Further, in a case where programs corresponding to the flowcharts shown in FIGS. 5 to 7 and 9 are recorded in an information recording medium such as a flexible disc and a hard disc, or acquired through the internet or the like and recorded, and then these are read out and executed by the general-purpose computer, the computer may be practiced as a control unit 21 in the node 1 according to the embodiment.

Embodiments

Next, an effect of the present invention in the delivery system S including a network of internet as an example is specifically described.

In other words, in a case where delivery of a content having, for example, a bit rate of 2 Mbps is received in the node 1, a data size for 1 second is "2000 Kbits/8 bits (1 byte is 8 bits)=250 Kbytes".

On the other hand, in a case where an information amount of one slice file DF is divided by 2 Mbytes, data of the one slice file DF corresponds to a content of 8 seconds.

Here, when a double speed reproduction process of n=32 is considered, provided that one key frame data KF is included in one second, it is necessary that data of 32 seconds as a content reach the node 1 within one second. In this case, since one slice file DF is as many as 8 seconds, four slice files DF (8 Mbytes in total) are necessary. When converting to a bit rate, "8 Mbytes/sec=64 Mbps", which is practically an impossible delivery speed.

When calculating in a way similar thereto, a double speed reproduction process of n=16 requires a delivery speed of 32 Mbps (bit rate). The delivery speeds are required to be 16 Mbps in case of n=8, 8 Mbps in case of n=4, and 4 Mbps in case of n=2.

On the contrary thereto, in a case where the present invention is applied, 30 frames of the content to be reproduced are embedded in "1 second". In assumption that one of them corresponds to the key frame data KF, a size of data to be delivered is simply reduced 1/30 according to the present invention. Therefore, a data size per 1 second is "250 Kbytes÷30≈8 Kbytes". Further, in the speed reproduction process of n=32, data of 32 seconds are necessary within 1 second. Therefore, it necessary that delivery of data of "32×8 Kbytes=256 Kbytes" is received. This is "256 Kbytes/sec≈2 Mbps" in terms of bit rate, and this delivery speed is substantially practical using, for example, an optical fiber line.

Assuming that the data size of key frame data KF is large enough to make the size of 30 frames to only 1/10, the required data amount is made simply 3 times. Therefore, the required delivery speed becomes 6 Mbps. In the case of this delivery speed, the delivery speed is also substantially practical using, for example, an optical fiber line.

INDUSTRIAL APPLICABILITY

As described above, the present invention is applicable to a field of content delivery using various modes of delivery systems. Especially, when it is applied to the content delivery in a delivery system that enables a double-speed reproduction process at a destination of the delivery, a conspicuous effect is obtainable.

The present invention is not confined to the configuration listed in the foregoing embodiments, but it is easily understood that the person skilled in the art can modify such configurations into various other modes, within the scope of the present invention described in the claims.

What is claimed is:

1. A node apparatus in a peer-to-peer (P2P) type data distribution system having a plurality of node apparatuses connected to each other via a network, in which a plurality of contents data and a plurality of divisional contents data are dispersed and stored in the plurality of node apparatuses, the divisional contents data being acquired by dividing the contents data, the divisional contents data being delivered to one of the node apparatuses from another node apparatus in the data distribution system, the node apparatus comprising:

a divisional contents data acquisition unit for acquiring the divisional contents data used in an audio data and video data reproduction process that is performed at an n-time speed, wherein n>1, and n=1 is single-speed, in response to performing the reproduction process at the n-time speed using the divisional contents data;

a confirmation information acquiring unit for acquiring confirmation information through the network, the confirmation information corresponding to the acquired divisional contents data and the confirmation information used for protecting the acquired divisional contents data against alteration;

a certification unit for carrying out a certification process to certify the acquired divisional contents data based on the acquired divisional contents data and the acquired confirmation information using the acquired confirmation information; and a processing unit for carrying out the reproduction process at the n-time speed using the acquired divisional contents data in response to certifying the divisional contents data by the certification unit.

2. The node apparatus according to claim 1, wherein, in response to the processing unit performing the reproduction process at the n-time speed using the divisional contents data, the certification unit carries out the certification process using the confirmation information of certifying a divisional contents data aggregate made by collecting a plurality of the acquired divisional contents data.

3. The node apparatus according to claim 2, wherein, in response to the processing unit performing the reproduction process at the n-time speed using the divisional contents data, the divisional contents data acquiring unit acquires the plurality of the divisional contents data constituting a second divisional contents data aggregate when the processing unit carries out the reproduction process at the n-time speed using a first divisional contents data aggregate, the second divisional contents data aggregate being an object of the reproduction process following the first divisional contents data aggregate; and the certification unit executes the certification process of certifying the acquired second divisional contents data aggregate after completing the acquisition of the divisional contents data constituting the second divisional contents data aggregate.

4. The node apparatus according to claim 1, wherein the divisional contents data acquisition unit acquires the divisional content data, and the processing unit carries out the reproduction process at the n-time speed using the acquired divisional contents data, the node apparatus further comprising:
    a residual contents data acquiring unit for acquiring, through the network, residual contents data indicative of divisional contents data other than the divisional contents data acquired by the divisional contents acquisition unit among the contents data,
    wherein the confirmation information acquisition unit acquires the confirmation information corresponding to an entire contents data including the acquired residual contents data and the acquired divisional contents data through the network,
    the certification unit carries out the certification process with respect to the entire contents data in response to acquiring the entire contents data, and
    the processing unit carries out the reproduction process at the n=1 speed using the entire contents data in response to certifying the entire contents data.

5. The node apparatus according to claim 1,
    wherein the reproduction process is a reproduction process using any one of divisional contents data aggregate and the entire contents data.

6. A contents data input apparatus included in the data distribution system including the node apparatus according to claim 1, an accumulating unit for accumulating the divisional contents data and the contents data so as to be acquired into the node apparatus, and the network connecting the node apparatus with the accumulating unit, comprising:
    a divisional contents data generating unit for generating the divisional contents data, which is delivered to one of the node apparatuses from the other node apparatus in the data distribution system, by dividing the contents data;
    a confirmation information generation unit for generating the confirmation information for certifying the generated contents data;
    a contents data input unit for accumulating the contents data to the accumulating unit; and
    a confirmation information processing unit for enabling the node apparatus to acquire the generated confirmation information.

7. The contents data input apparatus according to claim 6, wherein the confirmation information generation unit generates the confirmation information used for certifying the divisional contents data aggregate that is made by collecting a plurality of the divisional contents data.

8. An information processing method that is carried out in a contents data input apparatus included in the data distribution system including the node apparatus according to claim 1, an accumulating unit for accumulating the divisional contents data and the contents data in the information processing apparatus so as to be acquirable therein, and the network connecting the node apparatus to the accumulating device, the information processing method comprising:
    generating the divisional contents data, which is delivered to one of the node apparatuses from the other node apparatus in the data distribution system, by dividing the contents data;
    generating the confirmation information for certifying the generated contents data;
    enabling accumulation of the contents data in the accumulating unit; and
    enabling acquisition of the generated confirmation information in the node apparatus.

9. A non-transitory computer-readable storage medium that stores a computer-executable program, the computer being included in contents data input apparatus included in a including the node apparatus according to claim 1, an accumulating unit for accumulating the divisional contents data and the contents data so as to be acquired into the node apparatus, and the network connecting the node apparatus with the accumulating unit, the program causing the computer to perform steps comprising:
    generating the divisional contents data, which is delivered to one of the node apparatuses from the other node apparatus in the data distribution system, by dividing the contents data;
    generating the confirmation information for certifying the generated divisional information;
    accumulating the contents data to the accumulating unit; and
    enabling the node apparatus to acquire the confirmation information.

10. A contents data input apparatus included in the data distribution system including the node apparatus according to claim 2, an accumulating unit for accumulating the divisional contents data and the contents data so as to be acquired into the node apparatus, and the network connecting the node apparatus with the accumulating unit, the contents data input apparatus comprising:
    a divisional contents data generating unit for generating the divisional contents data, which is delivered to one of the node apparatuses from the other node apparatus in the data distribution system, by dividing the contents data;
    a confirmation information generation unit for generating the confirmation information for certifying the generated divisional information;
    a contents data input unit for accumulating the contents data to the accumulating unit; and
    a confirmation information processing unit for enabling the node apparatus to acquire the generated confirmation information.

11. A contents data input apparatus included in the data distribution system including the node apparatus according to claim 3, an accumulating unit for accumulating the divisional contents data and the contents data so as to be acquired into the node apparatus, and the network connecting the node apparatus with the accumulating unit, the contents data input apparatus comprising:
    a divisional contents data generating unit for generating the divisional contents data, which is delivered to one of the node apparatuses from the other node apparatus in the data distribution system, by dividing the contents data;
    a confirmation information generation unit for generating the confirmation information for certifying the generated divisional information;
    a contents data input unit for accumulating the contents data to the accumulating unit; and
    a confirmation information processing unit for enabling the node apparatus to acquire the generated confirmation information.

12. A contents data input apparatus included in the data distribution system including the node apparatus according to claim 4, an accumulating unit for accumulating the divisional contents data and the contents data so as to be acquired into the node apparatus, and the network connecting the node apparatus with the accumulating unit, the contents data input apparatus comprising:
    a divisional contents data generating unit for generating the divisional contents data, which is delivered to one of the node apparatuses from the other node apparatus in the data distribution system, by dividing the contents data;

a confirmation information generation unit for generating the confirmation information for certifying the generated divisional information;

a contents data input unit for accumulating the contents data to the accumulating unit; and a confirmation information processing unit for enabling the node apparatus to acquire the generated confirmation information.

13. A contents data input apparatus included in the data distribution system including the node apparatus according to claim 5, an accumulating unit for accumulating the divisional contents data and the contents data so as to be acquired into the node apparatus, and the network connecting the information processing apparatus with the accumulating unit, the contents data input apparatus comprising:

a divisional contents data generating unit for generating the divisional contents data, which is delivered to one of the node apparatuses from the other node apparatus in the data distribution system, by dividing the contents data;

a confirmation information generation unit for generating the confirmation information for certifying the generated divisional information;

a contents data input unit for accumulating the contents data to the accumulating unit; and a confirmation information processing unit for enabling the node apparatus to acquire the generated confirmation information.

14. The node apparatus according to claim 1, wherein the contents data includes moving picture data;

wherein the divisional contents data is key frame data which is a part of frame data constituting the moving picture data; and wherein, in response to the processing unit performing the reproduction process at the n-time speed using the key frame data, the certification unit carries out the certification process using the confirmation information by certifying a key frame data aggregate made by collecting a plurality of the acquired key frame data.

15. The node apparatus according to claim 14, wherein, in response to the processing unit performing the reproduction process at the n-time speed using the key frame data, the divisional contents data acquiring unit acquires, when the processing unit caries out the reproduction process of the n-time speed using a first key frame data aggregate, the plurality of the key frame data constituting a second key frame data aggregate, the second key frame data aggregate being an object of the reproduction process following the first key frame data aggregate, and the certification unit executes the certification process of certifying the acquired second key frame data aggregate after completing the acquisition of the key frame data constituting the second key frame data aggregate.

16. An information processing method carried out in a node apparatus in a peer-to-peer (P2P) data distribution system having a plurality of node apparatuses connected to each other via a network, in which a plurality of contents data and a plurality of divisional contents data are dispersed and stored in the plurality of node apparatuses, the divisional contents data being acquired by dividing the contents data, the divisional contents data being delivered to one of the node apparatuses from another node apparatus in the data distribution system, the information processing method comprising:

acquiring the divisional contents data used in an audio data and video data reproduction process that is performed at an n-time speed, wherein n>1, and n=1 is single-speed, in response to performing the reproduction process at the n-time using the divisional contents data;

acquiring confirmation information through the network, the confirmation information corresponding to the acquired divisional contents data and the confirmation information used for protecting the acquired divisional contents data against alteration;

carrying out a certification process to certify the acquired divisional contents data based on a comparison of the acquired divisional contents data and the acquired confirmation information using the acquired confirmation information; and carrying out the reproduction process at the n-time speed using the acquired divisional contents data in response to certifying the divisional contents data in the certification process.

17. A non-transitory computer-readable storage medium that stores a computer-executable program, the computer being included in a node apparatus included in a peer-to-peer (P2P) type data distribution system having a plurality of node apparatuses connected to each other via a network, a plurality of contents data and a plurality of divisional contents data being dispersed and stored in the plurality of node apparatuses of the data distribution system, the divisional contents data being acquired by dividing the contents data, the divisional contents data being delivered to one of the node apparatuses from another node apparatus in the data distribution system, the program causing the computer to perform steps comprising:

acquiring the divisional contents data used in an audio data and video data reproduction process that is performed at an n-time speed, wherein n>1, and n=1 is single-speed, in response to performing the reproduction process at the n-time using the divisional contents data;

acquiring confirmation information through the network, the confirmation information corresponding to the acquired divisional contents data and the confirmation information used for protecting the acquired divisional contents data against alteration;

carrying out a certification process to certify the acquired divisional contents data based on a comparison of the acquired divisional contents data and the acquired confirmation information using the acquired confirmation information; and carrying out the reproduction process at the n-time speed using the acquired divisional contents data in response to certifying the divisional contents data in the certification process.

* * * * *